United States Patent [19]
Akashi

[11] Patent Number: 5,325,307
[45] Date of Patent: Jun. 28, 1994

[54] SYNCHRONIZED OPERATION SYSTEM FOR NUMERICAL CONTROL APPARATUS

[75] Inventor: Seiji Akashi, Minamitsuru, Japan

[73] Assignee: Fanuc Ltd., Minamitsuru, Japan

[21] Appl. No.: 852,183

[22] PCT Filed: Oct. 5, 1991

[86] PCT No.: PCT/JP91/01370

§ 371 Date: May 29, 1992

§ 102(e) Date: May 29, 1992

[87] PCT Pub. No.: U1092/07313

PCT Pub. Date: Apr. 30, 1992

[30] Foreign Application Priority Data

Oct. 11, 1990 [JP] Japan ................................ 2-272991

[51] Int. Cl.$^5$ ............................................ G05B 19/18
[52] U.S. Cl. ........................... 364/474.11; 364/474.31; 318/573
[58] Field of Search ................... 364/474.11, 474.31; 318/573, 625

[56] References Cited

U.S. PATENT DOCUMENTS

| | | | |
|---|---|---|---|
| 4,109,309 | 8/1978 | Johnstone et al. | 364/474.11 |
| 4,262,336 | 4/1981 | Pritchard | 364/474.11 |
| 4,564,913 | 1/1986 | Yomogida et al. | 364/474.11 |
| 4,752,867 | 6/1988 | Backe et al. | 364/132 |
| 4,862,379 | 8/1989 | Fujimoto | 364/474.11 |
| 4,862,380 | 8/1989 | Kawamura et al. | 364/474.11 |
| 4,985,822 | 1/1991 | Yamashita et al. | 364/142 |
| 5,218,549 | 6/1993 | Kokura et al. | 364/474.31 |

FOREIGN PATENT DOCUMENTS

| | | |
|---|---|---|
| 59-100309 | 11/1984 | Japan . |
| 60-3007 | 1/1985 | Japan . |
| 60-45808 | 3/1985 | Japan . |
| 60-193012 | 10/1985 | Japan . |
| 63-54606 | 3/1988 | Japan . |
| 63-298604 | 12/1988 | Japan . |

*Primary Examiner*—Jerry Smith
*Assistant Examiner*—Paul Gordon
*Attorney, Agent, or Firm*—Staas & Halsey

[57] ABSTRACT

A synchronized operation system by which a plurality of independently controlled numerical control apparatuses (CNCs) are made to carry out a synchronized operation. An external signal generation circuit (1) supplies an external timing signal to respective CNCs (2,3), from the outside, and internal signal generation circuits (10, 20) generate internal timing signals for independently operating the CNCs (2, 3). Selection circuits (9, 19) select one of the external timing signals and the internal timing signal, and when the external timing signal is selected, the respective CNCs (2, 3) are operated by using the selected external timing signals as basic timing signals. Therefore, no time lag occurs between the basic timing signals of the respective CNCs (2, 3) an and thus the respective CNCs (2, 3) can carry out an extremely a closely synchronized operation, such as an interpolation, based on the basic timing signals.

11 Claims, 2 Drawing Sheets

SYNCHRONIZED OPERATION SYSTEM FOR NUMERICAL CONTROL APPARATUS

TECHNICAL FIELD

The present invention relates to a synchronized operation system used for controlling a plurality of numerical control apparatuses (CNCs), and more specifically, to a synchronized operation system for CNCs by which a plurality of independently controlled CNCs are made to carry out a synchronized operation.

BACKGROUND ART

Numerical control apparatuses (CNCs) are used at each station of a transfer line for machining parts for automobiles, and these CNCs contain a programmable machine controller (PMC) for controlling only a single axis. The CNCs of this type are referred to as a single-axis CNCs.

Although these single-axis CNCs are usually independently controlled, sometimes a plurality of single-axis CNCs must be simultaneously controlled for performing various operations, i.e., cutting an arc, and to accomplish this, the I/O circuits of the respective CNCs are interconnected and data is exchanged through the I/O circuits.

Nevertheless, when data is exchanged through the I/O circuits, in the operation of the respective CNCs, a time lag occurs and further, communication therebetween becomes complicated, and as a result, a high accurate synchronized operation, such as an interpolation, cannot be carried out.

SUMMARY OF THE INVENTION

Taking the above into consideration, an object of the present invention is to provide a synchronized operation system for CNCs by which an accurate synchronized operation, such as an interpolation, can be carried out among a plurality of CNCs.

To attain the above object, according to the present invention, there is provided a synchronized operation system for CNCs by which a plurality of independently controlled numerical control apparatuses (CNCs) are made to carry out a synchronized operation, the system comprising an external signal generation means for supplying an external timing signal to each of the CNCs, from the outside, an external signal receiving means for receiving the external timing signal, an internal signal generation means for generating an internal timing signal, to operate the CNCs independently, and a basic timing signal selection means for selecting one of the external timing signal received from the external signal receiving means and the internal timing signal received from the internal signal generation means and supplying the selected signal to the CNCs as a basic timing signal.

The external signal generation means supplies an external timing signal to the respective CNCs, from the outside, and the external signal receiving means receives the external timing signal. The internal signal generation means generates an internal timing signal for operating the CNCs independently, and the basic timing signal selection means selects one of the external timing signal received from the external signal generation means and the internal timing signal received from the internal signal generation means, and supplies the selected signal to the CNCs as a basic timing signal.

As a result, after the basic timing selection means has selected the external timing signal, the respective CNCs are operated by using the external timing signal as a basic timing signal. Accordingly, no time lag occurs among the basic timing signals for the respective CNCs, and thus the respective CNCs can be operated while closely synchronized with each other, and can cooperate to carry out even a high accurate synchronized operation, such as an interpolation, based on the basic timing signals.

DESCRIPTION OF THE INVENTION

An embodiment of the present invention will be described below with reference to the drawings.

Figure 1:
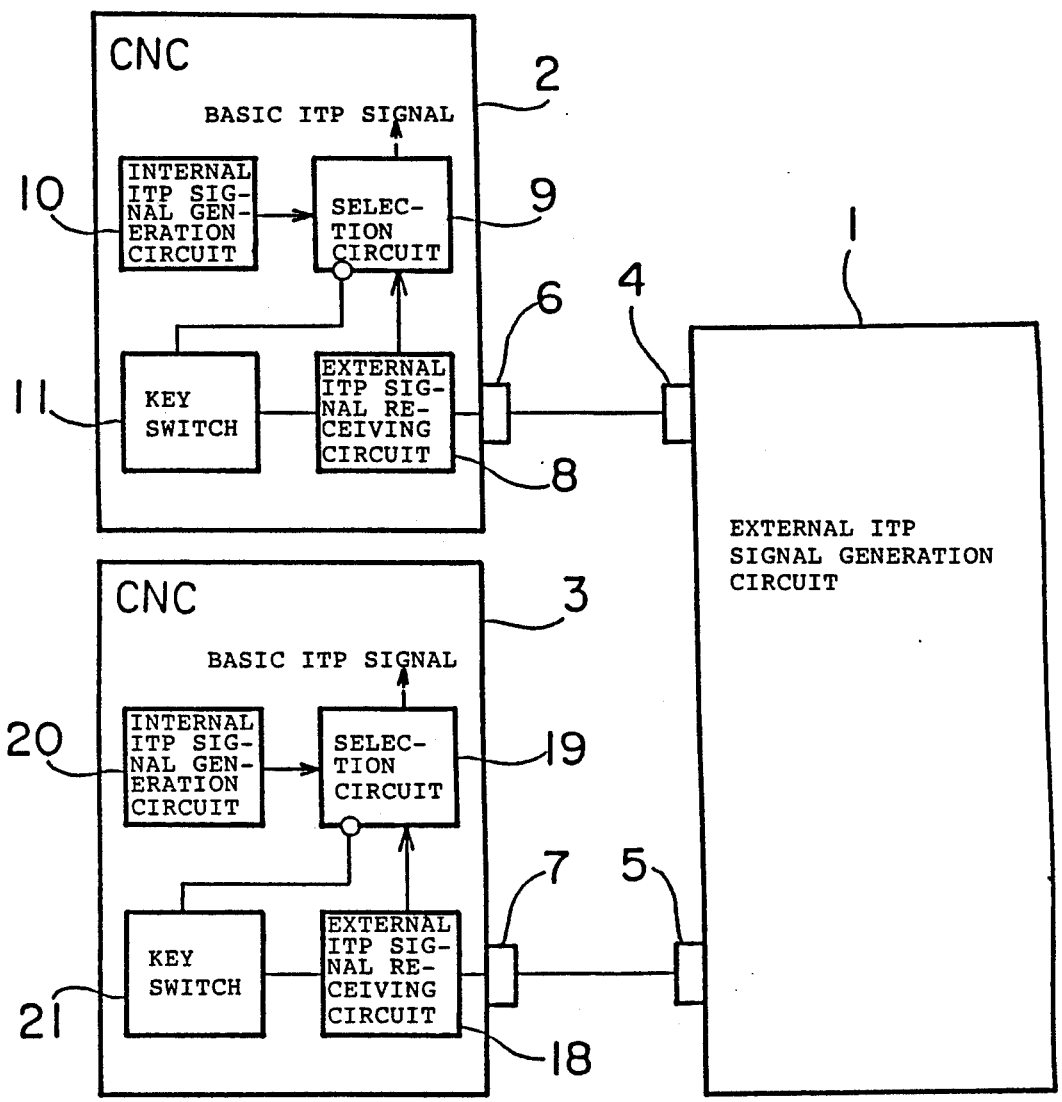
FIG. 1 is a schematic diagram showing the arrangement of a synchronized operation system for CNCs according to the present invention.

FIG. 1 is a schematic diagram showing the arrangement of a synchronized operation system for CNCs according to the present invention, wherein an external ITP signal generation circuit 1 supplies an external ITP signal to a plurality (here, 2 sets) of CNCs 2 and 3. Note, the ITP (interpolation) signal is a timing signal for performing an interpolation.

The external ITP signal generation circuit 1 may be contained in a CNC different from the CNCs 2 and 3; with this arrangement, the different CNC can be operated as a master CNC and the CNCs 2 and 3 each can be operated as a slave CNC.

Further, the external ITP signal generation circuit 1 may be arranged as an independent circuit unit.

The external ITP signal is output through the connectors 4 and 5 of the ITP signal generation circuit 1 and input to the respective CNCs through the connector 6 of the CNC 2 and the connector 7 of the CNC 3, respectively. This external ITP signal is obtained by dividing a clock contained in the external ITP signal generation circuit 1.

Since the CNCs 2 and 3 are single-axis CNCs and have the same arrangement, only the CNC 2 will be described here.

The external ITP signal supplied to the CNC 2 is received by an external ITP signal receiving circuit 8, and is supplied to a selection circuit 9 by the receiving circuit 8.

An internal ITP signal generation circuit 10 supplies an internal ITP signal to the selection circuit 9. The internal ITP signal is obtained by dividing the clock contained in the internal ITP signal generation circuit 10, in the same way the external ITP signal is generated.

The selection circuit 9 receiving the external ITP signal and the internal ITP signal is connected to a key switch 11 which is provided for selecting one of the external ITP signal and internal ITP signal and is actuated by an operator.

When the external ITP signal is selected by the key switch 11, the selection circuit 9 selects the external ITP signal, and when the internal ITP signal is selected by the key switch 11, the selection circuit 9 selects the internal ITP signal. The signal selected by the selection circuit 9 is output therefrom as a basic ITP signal of the CNC 2.

Further, the selection circuit 19 of the CNC 3 selects one of the external ITP signal and an internal ITP signal, in the same way as the selection circuit 9 of the CNC 2, and outputs the selected signal as a basic ITP signal of the CNC 3.

When the basic ITP signals are external ITP signals, the basic ITP signals of the CNCs 2 and 3 have no time lag, and thus the CNCs 2 and 3 can be operated while being closely synchronized with each other based on the basic ITP signals, and therefore, the CNCs 2 and 3 can cooperate to carry out even highly accurate synchronized operation such as an interpolation.

In this case, a communication line conventionally provided between the CNCs 2 and 3 for a high accurate synchronized operation thereof is not necessary, and thus the communication relationship therebetween can be simplified.

When the basic ITP signals are internal ITP signals, the CNCs 2 and 3 are controlled independently, based on the respective internal ITP signals.

Figure 2:
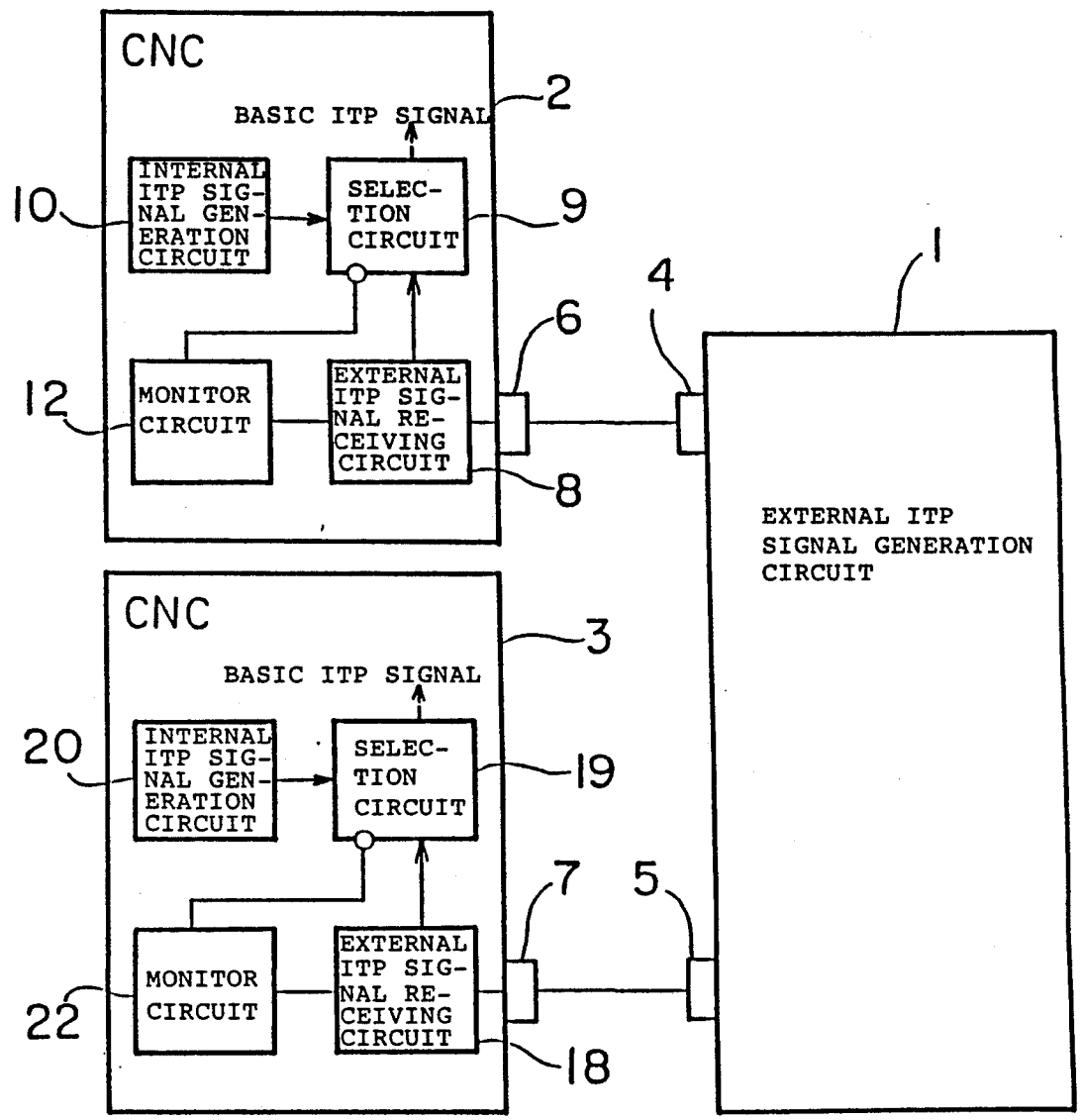
FIG. 2 is a diagram showing another embodiment according to the present invention.

FIG. 2 is a diagram showing another embodiment according to the present invention. This embodiment is different from the first embodiment in that a monitor circuit 12 is used in place of the key switch 11. The monitor circuit 12 comprises of, for example, a watch dog timer, and determines whether or not the state in which an external ITP signal is received has been changed, by monitoring the external ITP signal receiving circuit 8.

A selection circuit 9 selects one of an external ITP signal and internal ITP signal, based on the result of the determination of the monitor circuit 12. More specifically, when the external ITP signal receiving circuit 8 receives the external ITP signal, the selection circuit 9 selects the external ITP signal, and when the external ITP signal receiving circuit 8 does not receive the external ITP signal, the selection circuit 9 selects the internal ITP signal.

As described above, the use of the monitor circuit 12 allows an automatic change of a basic ITP signal output from the selection circuit 9.

Although the above description refers to a case in which 2 sets of CNCs are used, the present invention can be applied in the same way to a case in which more than 2 sets of CNCs are used.

As described above, according to the present invention, since the respective CNCs are operated by using external ITP signals as basic ITP signals, no time lag occurs between the basic ITP signals of the respective CNCs, and thus the respective CNCs can be operated while being closely synchronized with each other, based on the basic ITP signals and, as a result, the CNCs can cooperate to carry out a high accurate synchronized operation such as an interpolation.

I claim:

1. A synchronized operation system by which a plurality of independently controlled numerical control apparatuses are made to carry out a synchronized operation, said synchronized operation system comprising:
external signal generation means for supplying an external timing signal to each of said plurality of independently controlled numerical apparatuses, from the outside; and
each of said plurality of independently controlled numerical control apparatuses comprising:
external signal receiving means for receiving said external timing signal;
internal signal generation means for generating an internal timing signal for operating the respective one of said plurality of independently controlled numerical control apparatuses independently; and
basic timing signal selection means for selecting one of said external timing signal received from said external signal receiving means and said internal timing signal received from said internal signal generation means of the respective one of said plurality of independently controlled numerical control apparatuses, to generate a selected signal and supplying said selected signal to the respective one of said plurality of independently controlled numerical control apparatuses as a basic timing signal.

2. The synchronized operation system according to claim 1, wherein each of said basic timing signal selection means selects one of said external timing signal and said internal timing signal of the respective one of said plurality of independently controlled numerical control apparatuses in accordance with a selection made by using a key switch.

3. The synchronized operation system according to claim 1, wherein each of said basic timing signal selection means selects said external timing signal when said external timing signal is received and selects said internal timing signal of the respective one of said plurality of independently controlled numerical control apparatuses when said external timing signal is not received, in accordance with a result of a monitoring carried out by a monitor means for monitoring said external timing signal.

4. A synchronized operation system for CNCs according to claim 1, wherein said external signal receiving means, said internal signal generation means and said basic timing signal selection means are provided within each of said CNCs.

5. The synchronized operation system according to claim 1, wherein each of said external timing signal and said internal timing signals is an interpolation signal.

6. The synchronized operation system according to claim 1, wherein each of said plurality of independently controlled numerical control apparatuses is a single-axis numerical control apparatus.

7. The synchronized operation system according to claim 1, wherein said external signal generation means is contained in a numerical control apparatus other than one of said plurality of independently controlled numerical control apparatuses.

8. The synchronized operation system according to claim 1, wherein each of said plurality of independently controlled numerical control apparatuses further comprises:
key switch means for receiving an input from an operator, and controlling said basic timing signal selection means of the respective one of said plurality of independently controlled numerical control apparatuses in dependence upon said input from the operator.

9. The synchronized operation system according to claim 1, wherein each of said plurality independently controlled numerical control apparatuses further comprises:
monitor means for determining a state of said external timing signal and controlling said basic timing signal selection means of the respective one of said plurality of independently controlled numerical control apparatuses to select one of said internal timing signal of the respective one of said plurality of independently controlled numerical control apparatuses and said external timing signal in dependence upon said determination.

10. The synchronized operation system according to claim 9, wherein each of said monitor means comprises: a watchdog timer.

11. The synchronized operation system according to claim 9, wherein each of said monitor means controls said basic timing signal selection means of the respective one of said plurality of independently controlled numerical control apparatuses to select said external timing signal if said external signal is received by said each monitor means and controls said basic timing signal selection means of the respective one of said plurality of independently controlled numerical control apparatuses to select said internal timing signal of the respective one of said plurality of independently controlled numerical control apparatuses if said external signal is not received by said monitor means.

* * * * *

UNITED STATES PATENT AND TRADEMARK OFFICE
CERTIFICATE OF CORRECTION

PATENT NO. : 5,325,307
DATED : June 28, 1994
INVENTOR(S) : Seiji Akashi

It is certified that error appears in the above-indentified patent and that said Letters Patent is hereby corrected as shown below:

Cover Page, [87] PCT Pub. No., "U1" should be --W--.

Abstract, line 10, "signal" should be --signal--;

line 15, after each of both occurrences of (2,3) insert a --,--, and delete "an"; and line 16, delete "an extremely".

Col. 2, line 8, "high" should be --highly--; and line 18, before "DESCRIPTION" insert --DETAILED--.

UNITED STATES PATENT AND TRADEMARK OFFICE
CERTIFICATE OF CORRECTION

PATENT NO. : 5,325,307
DATED : June 28, 1994
INVENTOR(S) : Seiji Akashi

It is certified that error appears in the above-indentified patent and that said Letters Patent is hereby corrected as shown below:

Column 3, line 9, after "even" insert --a--.
          line 10, after "operation" insert a --, --;
          line 51, "high" should be --highly --; and
          line 52, after "operation" insert a --, --.
Column 4, line 31, delete "for CNCS".
Column 5, line 4, "[9]" should be --1 --; and
          line 7, "[9]" should be --1--.

Signed and Sealed this

Twenty-seventh Day of September, 1994

Attest:

BRUCE LEHMAN

*Attesting Officer*     *Commissioner of Patents and Trademarks*